United States Patent
Ooba

(10) Patent No.: US 11,224,242 B2
(45) Date of Patent: Jan. 18, 2022

(54) FROZEN MINCED FISH MEAT AND METHOD FOR MANUFACTURING THE SAME

(71) Applicant: NIPPON SUISAN KAISHA, LTD., Tokyo (JP)

(72) Inventor: Takahiro Ooba, Hachioji (JP)

(73) Assignee: NIPPON SUISAN KAISHA, LTD.

(*) Notice: Subject to any disclaimer, the term of this patent is extended or adjusted under 35 U.S.C. 154(b) by 573 days.

(21) Appl. No.: 16/089,986

(22) PCT Filed: Mar. 27, 2017

(86) PCT No.: PCT/JP2017/012423
§ 371 (c)(1),
(2) Date: Sep. 28, 2018

(87) PCT Pub. No.: WO2017/170420
PCT Pub. Date: Oct. 5, 2017

(65) Prior Publication Data
US 2020/0315224 A1    Oct. 8, 2020

(30) Foreign Application Priority Data
Mar. 30, 2016 (JP) .............................. JP2016-069201

(51) Int. Cl.
*A23L 17/10* (2016.01)
*A23L 17/00* (2016.01)
(Continued)

(52) U.S. Cl.
CPC ............ *A23L 17/70* (2016.08); *A22C 7/0092* (2013.01); *A22C 17/0026* (2013.01);
(Continued)

(58) Field of Classification Search
CPC . A23L 17/70; A23L 17/10; A23L 3/36–3/364; A23P 10/25; A23P 10/20;
(Continued)

(56) References Cited

U.S. PATENT DOCUMENTS 1,943,019 A * 1/1934 Henney .................. A23B 4/068
                                                426/393
3,579,359 A * 5/1971 Schjolberg .............. A23L 3/364
                                                426/513
(Continued)

FOREIGN PATENT DOCUMENTS

EP    0 724 845 A1    8/1996
FR    2 767 031 A1    2/1999
(Continued)

OTHER PUBLICATIONS

Translation of JP 58101641A (Year: 1983).*
(Continued)

*Primary Examiner* — Drew E Becker
(74) *Attorney, Agent, or Firm* — Harness, Dickey & Pierce, P.L.C.

(57) ABSTRACT

A frozen product of minced fish meat frozen into granules includes: 90 wt % or more of meat granules having a substantially columnar shape with a 3 mm to 7 mm diameter; and 10 wt % or less of meat granules with a short diameter of 2 mm or less. A method of producing the minced fish meat frozen into granules includes: raising the temperature of fish meat which has been frozen at −20° C. or less to a temperature of from −10° C. to −5° C.; mincing the fish meat while maintaining the temperature of the fish meat at −10° C. to −5° C. by using a meat mincer having a feed screw, a plate, and a plate knife at a rotation speed of 200 rpm or less;
(Continued)

lowering the temperature of minced fish meat to −20° C. or less; and crushing the minced fish meat frozen at −20° C. or less into granules.

8 Claims, 5 Drawing Sheets

(51) Int. Cl.
    *A23P 10/25*     (2016.01)
    *A22C 25/20*     (2006.01)
    *A23B 4/06*     (2006.01)
    *A23L 3/36*     (2006.01)
    *A22C 17/00*     (2006.01)
    *A22C 7/00*     (2006.01)

(52) U.S. Cl.
    CPC .............. *A22C 25/20* (2013.01); *A23B 4/066* (2013.01); *A23B 4/068* (2013.01); *A23L 3/36* (2013.01); *A23L 17/10* (2016.08); *A23P 10/25* (2016.08); *A23V 2002/00* (2013.01)

(58) Field of Classification Search
    CPC ......... A23P 30/20; A22C 25/20; A22C 25/00; A22C 25/18; A22C 7/0092; A22C 11/08; A22C 17/0026; A23B 4/06–4/4068; A23V 2002/00; A23V 2300/20
    See application file for complete search history.

(56) References Cited

U.S. PATENT DOCUMENTS

| | | | | |
|---|---|---|---|---|
| 4,687,672 A * | 8/1987 | Vitkovsky | ................. | F25D 3/11 |
| | | | | 426/524 |
| 4,816,279 A * | 3/1989 | Katoh | ..................... | A23P 30/20 |
| | | | | 366/307 |
| 4,832,972 A * | 5/1989 | Toledo-Flores | .......... | A23B 4/08 |
| | | | | 426/327 |
| 5,080,922 A * | 1/1992 | Hosokawa | ......... | A22C 17/0026 |
| | | | | 426/646 |
| 5,804,245 A * | 9/1998 | Desoomer | .............. | A23B 4/068 |
| | | | | 426/643 |
| 5,958,501 A * | 9/1999 | Hoashi | ..................... | A23B 4/07 |
| | | | | 426/643 |
| 7,306,820 B2 * | 12/2007 | Hoashi | ..................... | A23B 4/07 |
| | | | | 426/513 |
| 2002/0037345 A1 | 3/2002 | Hoashi et al. | | |
| 2005/0181103 A1 * | 8/2005 | Jonsson | ................. | A22C 25/20 |
| | | | | 426/518 |
| 2007/0243309 A1 | 10/2007 | Mizuguchi et al. | | |
| 2016/0198744 A1 * | 7/2016 | Vezzani | ................. | A23L 7/143 |
| | | | | 426/241 |

FOREIGN PATENT DOCUMENTS

| | | | |
|---|---|---|---|
| GB | 2 371 969 A | | 8/2002 |
| GB | 2371969 A | * 8/2002 | ............. A23L 17/70 |
| JP | S58-101641 A | | 6/1983 |
| JP | H07-250614 A | | 10/1995 |
| JP | H10-327745 A | | 12/1998 |
| JP | 2003-125738 A | | 5/2003 |
| JP | 2005-305404 A | | 11/2005 |
| JP | 2009-17868 A | | 1/2009 |
| RU | 2 084 186 C1 | | 7/1997 |
| WO | 1997-004671 A1 | | 2/1997 |
| WO | 2005-117614 A1 | | 12/2005 |

OTHER PUBLICATIONS

Translation of JP 08280323A (Year: 1996).*
Abstract for SE 8804185A, Sweden, May 1990, Helmvee (Year: 1990).*
Japanese Office Action for corresponding Application No. 2017-518587 dated Jan. 5, 2021 with English translation (9 Pages).
CO-OP Osakana no Parapara Minchi [online], Jan. 2016, [retrieval date Jun. 7, 2017 (Jun. 7, 2017)] Internet: <URL: http://www.coopnet.jp/product/osusume_coop/2016/201601.html> entire text.
Meat Chopper [online], May 15, 2015 (May 15, 2015), [retrieval date Jun. 8, 2017 (Jun. 8, 2017)], Internet: <URL: http://www.endoshoji.co.jp/QA/QA/CMC11.html> entire text.
"Osakana Dake" de Tsukutta Parapara Minchi ga Shin Tojo shimashita [online], Nov. 14, 2016 (Nov. 14, 2016), [retrieval date Jun. 7, 2017 (Jun. 7, 2017)] Internet: <URL: https://community.coopdeli.jp/article/blog/inf/3519/>.
European Office Action for Application No. 17 774 957.9 dated Jan. 16, 2020 (5 pages).
Chinese Office Action for corresponding Application No. 201780018736.3 dated Jun. 1, 2021 with English translation (14 Pages).
"About Minced Plates and Knives", online, Jul. 27, 2015, search date Jun. 23, 2021, URL, https://web.archive.org/web/20150727072805/https://www.nantsune.co.jp/products/meat-chopper/win_plate-knife.htm) with computer-generated English translation cited in the Japanese Office Action dated Jul. 6, 2021 issued for the corresponding Japanese Patent Application No. 2017-518587.

* cited by examiner ined fish meat of good quality can be obtained by carefully selecting a raw material and elaborating the usage of a meat chopper (meat mincer) to be used for livestock meat.
FROZEN MINCED FISH MEAT AND METHOD FOR MANUFACTURING THE SAME

CROSS REFERENCE TO RELATED APPLICATIONS

This application is a U.S. National Phase Application under 35 U.S.C. 371 of International Application No. PCT/JP2017/012423 filed on Mar. 27, 2017 and published in Japanese as WO 2017/170420 A1 on Oct. 5, 2017 which claims the benefit of priority from Japanese Patent Application No. 2016-069201 filed on Mar. 30, 2016. The entire disclosures of all of the above applications are incorporated herein by reference.

TECHNICAL FIELD

The present invention relates to a frozen product of minced fish meat frozen into granules like minced livestock meat, and a method of producing the same.

BACKGROUND ART

As one of the reasons that the consumption of fish meat does not grow as compared to livestock meat, there is given the reason that it takes time and effort and is cumbersome to cook fish meat due to presence of bones and internal organs. There has hitherto been a desire that fish meat be provided in a shape that can be used easily even in a small amount as in minced livestock meat. However, fish meat and livestock meat are different from each other in composition and physical properties. Fish meat is physically brittle. The fibers of fish meat are fine. The content of oils and fats in fish meat is small, however, an oxidative stability of fish oil is low. Thus, for various reasons, fish meat having a shape that can be used easily even in a small amount has not been put to practical use.

In JP-A-58-101641, there is disclosed a method of producing minced food frozen into granules, including: mincing a material that has tackiness at normal temperature when minced while keeping an article temperature of from 0° C. to −10° C.; and stirring and freezing the minced material while keeping a temperature of −10° C. or less. In Example, there is disclosed that beef meat is minced, and the minced meat is frozen into granules with snowy dry ice.

In JP-A-07-250614, there is disclosed a method of freezing food, including: mincing food while keeping an article temperature of from 0° C. to −10° C.; and stirring and freezing the minced food into granules while keeping a temperature of −10° C. or less. In the disclosed method, at a time of conveying minced food with a conveyor and supplying the minced food to an inside of a rotary drum through an inlet, dry ice snow is supplied to the minced food or to both the minced food and the inside of the rotary drum, and a mixture of the food and the dry ice snow is stirred in the rotary drum, to thereby obtain a product frozen into granules.

An objective of the invention is to produce a frozen product of minced fish meat which is frozen into granules like minced livestock meat with good quality by a simple method.

SUMMARY

In order to provide a frozen product of minced fish meat at low cost by a simple method, the inventor of the invention has attempted various methods. As a result, the inventor of the invention has found that a frozen product of minced fish meat of good quality can be obtained by carefully selecting a raw material and elaborating the usage of a meat chopper (meat mincer) to be used for livestock meat.

The invention encompasses the following frozen minced fish meats (1) to (3) and production methods (4) to (6).

(1) Frozen minced fish meat frozen into granules, including: meat granules each having a substantially columnar shape with a diameter of from 3 mm to 7 mm, the content of which being 90 wt % or more; and meat granules each having an incomplete shape with a short diameter of 2 mm or less, the content of which being 10 wt % or less.

(2) The frozen minced fish meat of (1), wherein the frozen minced fish meat is white-fleshed fish, salmon or trout.

(3) The frozen minced fish meat of (1) or (2), wherein the frozen minced fish meat is meat of a fish block, frozen ground fish meat, or frozen picked fish meat.

(4) A method of producing minced fish meat frozen into granules, including:

a) raising the temperature of fish meat which has been frozen at −20° C. or less to a temperature of from −10° C. to −5° C.;

b) mincing the fish meat while maintaining the temperature of the fish meat at a temperature of from −10° C. to −5° C. by using a meat mincer having a feed screw, a plate, and a plate knife at a rotation speed of 200 rpm or less of the plate knife;

c) cooling the minced fish meat to −20° C. or less; and d) crushing the minced fish meat frozen at −20° C. or less into granules.

(5) The method of (4), further including adjusting the meat mincer to keep a clearance (gap) between the plate knife and the feed screw of the meat mincer at 1 mm or less before mincing the fish meat.

(6) The method of (4) or (5), wherein a fish block, frozen ground fish meat, or frozen picked fish meat is used as raw material fish meat.

ADVANTAGEOUS EFFECTS OF INVENTION

The method of the invention enables the production of frozen fish meat frozen into granules with satisfactory quality in which the content of small meat pieces having a semicolumnar shape, a flake shape, or an incomplete shape such as a chip, instead of an original columnar shape, is small. The frozen fish meat frozen into granules of the invention can be distributed in a cold chain at a temperature of from about −30° C. to about −15° C., and the quality thereof can be kept for a period of from about 6 months to about 12 months.

DETAILED DESCRIPTION

Figure 1:
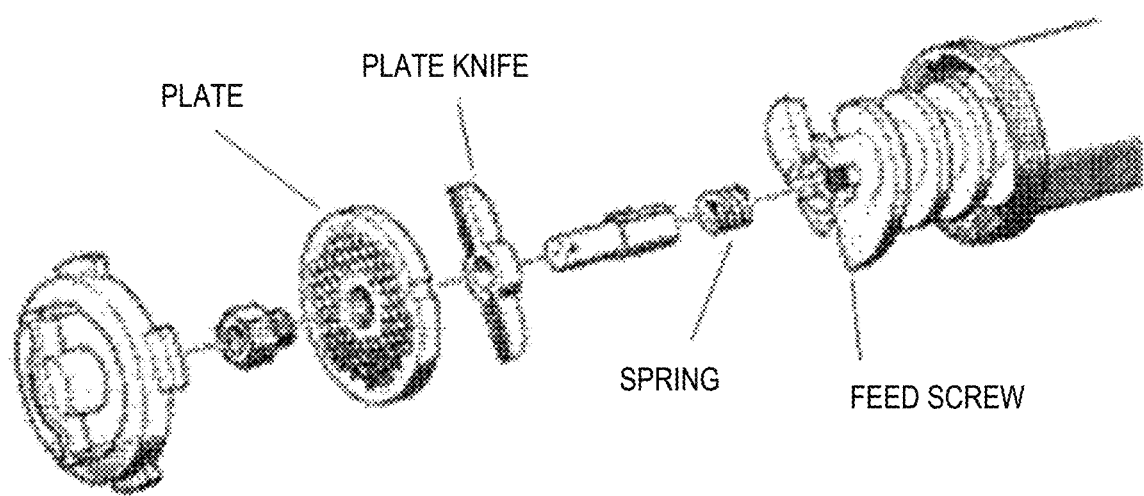
FIG. 1 is a schematic view for illustrating a structure of a meat mincer.
Figure 2:
FIG. 2 is a photograph of a product which is obtained when the rotation number of each of a plate knife and a feed screw is set to 121 rpm in an example.
Figure 3:
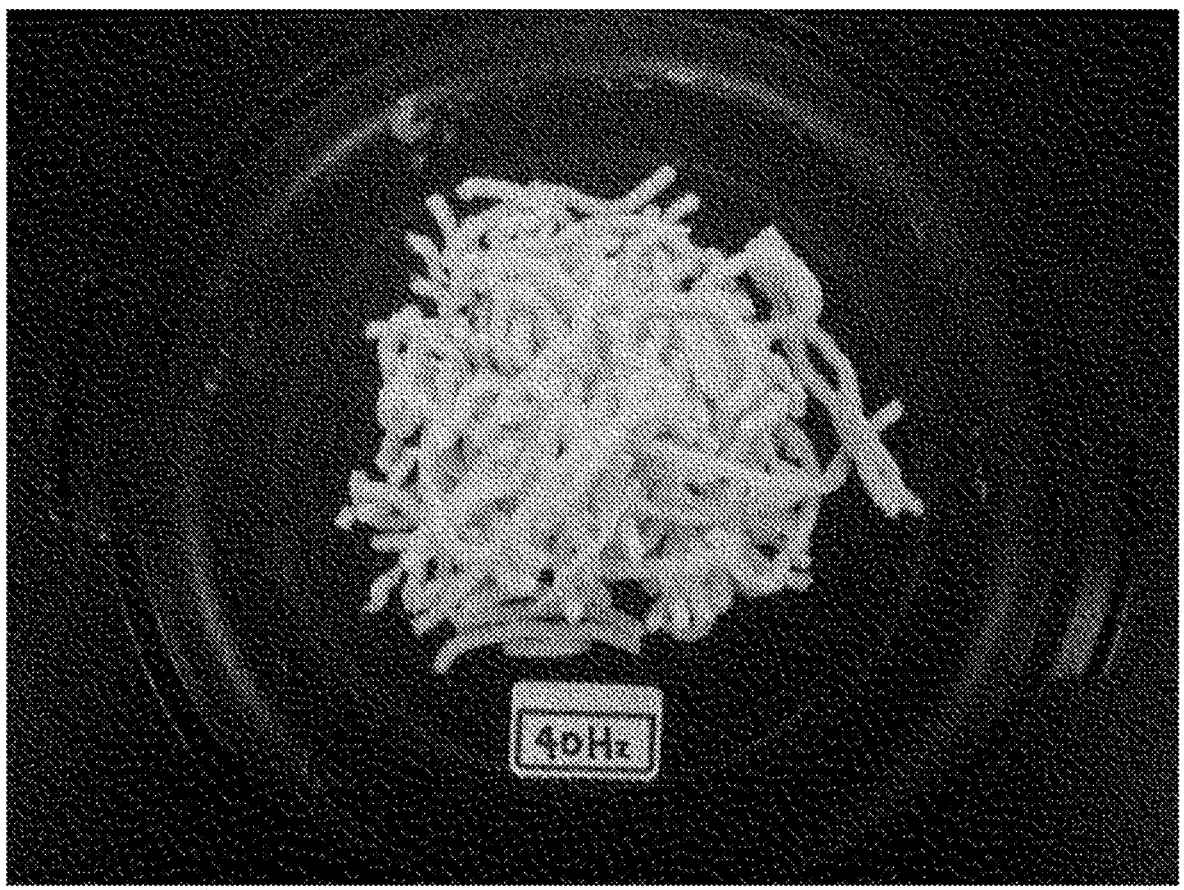
FIG. 3 is a photograph of a product which is obtained when the rotation number of each of the plate knife and the feed screw is set to 162 rpm in an example.
Figure 4:
FIG. 4 is a photograph of a product which is obtained when the rotation number of each of the plate knife and the feed screw is set to 203 rpm in an example.
Figure 5:
FIG. 5 is a photograph of a product which is obtained when the rotation number of each of the plate knife and the feed screw is set to 243 rpm in an example.

The invention relates to minced fish meat cut to a minced shape.

As fish meat to be used, any fish meat can be used, but fish species having solid muscle is preferred. Specifically, there are given Siluriformes (American catfish, Pangasius, etc.), Salmoniformes (coho salmon, sockeye salmon, etc.), Gadiformes (Alaska pollack, blue grenadier, common hake, etc.), Clupeiformes (anchovy, pilchard, etc.), Beloniformes (saury, flying fish, etc.), Beryciformes, Synbranchiformes (flathead, sablefish, etc.), Perciformes (tuna, yellowtail, goatfish, Nile tilapia, cobia, horse mackerel, hairtail, southern mackerel, bonito, red sea bream, golden threadfin bream, croaker, etc.), Pleuronectiformes (flatfish, halibut, Greenland halibut, etc.), and the like. Fish meat having skin, internal organs, bones, and the like removed therefrom is used. Raw fish meat that is directly frozen, a fish block obtained by subjecting raw fish meat to block freezing, frozen ground fish meat obtained by grinding raw fish meat and freezing the ground raw fish meat, or the like can be used as a raw material. When fish meat is directly used, minced meat keeping taste and flavor of the fish meat can be produced. When frozen ground fish meat is used as a raw material, versatile minced fish meat, which is excellent in preserving property and has less color and smell, can be produced. White-fleshed fish and salmon or trout are suitable for frozen storage from the viewpoint of color and smell as compared to lean fish.

The frozen ground fish meat (surimi) of white-fleshed fish is obtained by collecting fish meat of codfishes such as Alaska pollack (*Theragra chalcogram*) and southern blue whiting (*Micromesistius australis*) which belong to Gadiformes (Gadidae) and blue grenadier (Macruronus magellanicus) which belongs to Gadiformes (Macruronidae) or lizardfishes such as lizardfish (*Saurida* sp.) which belongs to Aulopiformes (Synodontidae), putting the fish meat in water, dehydrating the fish meat, and freezing the fish meat. In many cases, a freezing denaturation inhibitor such as salts or sugars is added to the fish meat, and then the fish meat is frozen to be distributed.

The frozen block of raw fish is generally obtained by packing fish meat having a head, internal organs, skin, bones, and the like removed therefrom into a freezing pan and frozen in a block shape.

The frozen minced fish meat of the invention is produced as described below.

The temperature of frozen ground fish meat or a frozen block of fish meat is raised to a temperature of from −10° C. to −5° C. in a refrigerator. The temperature of −10° C. or less is not preferred because the fish meat becomes excessively hard. The temperature of −5° C. or more is not preferred because the temperature of the fish meat rises excessively when being taken out from a meat mincer, with the result that minced fish meat granules adhere to each other. The fish meat is shredded to a size suitable for being loaded into the meat mincer with a band saw, a silent cutter, or the like. Depending on the kind and the size of the meat mincer, the fish meat is cut to a cubic shape measuring from about 3 cm to about 5 cm per side or a bar shape having a cross section measuring from about 3 cm to about 5 cm per side. In the case of the silent cutter, the fish meat is stirred until the fish meat has a size close to the above-mentioned size. During shredding, the temperature is also maintained at a temperature of from −10° C. to −5° C. so that the temperature of the fish meat does not rise.

The shredded fish meat is loaded into the meat mincer to obtain minced fish meat. As the meat mincer, any meat mincer used for livestock meat may be used. The meat mincer is a device having a structure of extruding fish meat through holes each having a certain diameter. In general, as illustrated in a schematic view of FIG. 1, the meat mincer has a structure including a feed screw configured to push meat into the device, a plate having holes each having a certain diameter, and a plate knife configured to cut fibers of the meat by rotating in front of the plate. There is a type further including a charging screw configured to supply fish meat to the feed screw.

Feed balance between the feed screw and the charging screw is important when the frozen fish meat is loaded into the meat mincer. The frozen meat includes frozen lumps, and hence gaps are liable to be formed between the lumps. When there are gaps between the lumps, a mixing ratio of minced fish meat having a chip shape with a half size of the hole of the plate instead of the shape filling the entire surface of the hole of the plate, frozen fish meat having a flake shape instead of a columnar shape, and the like increases. In particular, when minced meat formed of large granules, such as coarsely minced meat, is produced through use of a plate having large holes, there arises a problem. It is required to adjust the feed amount of the charging screw to be larger than that of the feed screw.

The rotation speed of the plate knife is more important. The plate knife is generally coupled to the feed screw, and hence the plate knife rotates at the same speed as that of the feed screw. The production efficiency can be enhanced by increasing the speed of the feed screw. However, it has been found that this increase in speed of the feed screw increases the occurrence rate of meat granules each having an incomplete shape. Specifically, the occurrence of meat granules each having an incomplete shape can be reduced by setting the rotation speed of the plate knife to 200 rpm or less, preferably 165 rpm or less, more preferably 130 rpm or less. As described in the Examples, the amount of meat granules each having an incomplete shape can be reduced to 10 wt % or less by limiting the speed of the plate knife.

Further, in many cases, the plate knife and the feed screw are not fixed to each other, and a certain clearance is secured therebetween with a spring. When this clearance becomes larger, the occurrence rate of meat granules each having an incomplete shape increases. Therefore, it is preferred that the clearance is adjusted to 1 mm or less, more preferably 0.5 mm or less. It is particularly preferred that the clearance be brought close to 0 mm and be set to substantially 0 mm.

The frozen minced fish meat produced by the above-mentioned method includes meat granules having a semicolumnar shape, a flake shape, or a threadlike incomplete shape, instead of a substantially columnar shape, the content of the meat granules being 10 wt % or less, preferably 7 wt % or less, more preferably 5 wt % or less, and meat granules having a substantially columnar shape with a diameter of the hole of the plate, specifically, a diameter of from 3 mm to 7 mm, the content of the meat granules being 90 wt % or more. Thus, the frozen mince fish meat has good quality in which meat granules each having an incomplete shape are not prominent. The substantially columnar shape as used herein encompasses a complete columnar shape or a distorted complete columnar shape and excludes a shape having a short diameter distorted to 2 mm or less, a shape of a meat granule extruded in an incomplete shape having a short diameter of 2 mm or less without originally having a columnar shape, and the like.

The product of the invention is a product that is not heated before freezing and is food that is eaten after being heated at a time of ingestion. However, the product of the invention is formed of raw fish meat and has a large surface area, and hence it is required to also take bacterial contamination and the like into consideration. In general, it is required to use a raw material having a bacterial count of 106 or less, preferably 104 or less in a stage of frozen fish meat of the raw material. A production process is performed at low temperature, and hence bacteria do not grow.

Further, when frozen ground fish meat or frozen picked fish meat is used as a raw material, it is preferred to use the frozen ground fish meat or the frozen picked fish meat having a moisture amount of 76 wt % or less. Ground fish meat or picked fish meat, which is properly dehydrated so as to have a moisture amount reduced to be small, has a high protein content and is less liable to be subject to bacterial contamination. Further, because of the small moisture amount, minced fish meat is properly hard, and hence the shape thereof is kept.

An antioxidant, a preserving agent, and the like may be added to the fish meat. The antioxidant, the preserving agent, and the like can be added to the fish meat by mixing, spraying, or the like in a stage in which the fish meat is in a state of ground fish meat, a stage in which the fish meat is cut before being minced, or after the fish meat is minced. After being minced, the fish meat can also be mixed with another frozen food as long as the fish meat is refrozen.

Now, the Examples of the invention are described, but the invention is not limited thereto.

Example 1

A ground fish meat block of Alaska pollack (Unisea, Inc., A grade, moisture content: 73.9 g/100 g, containing 8 wt % in total of sugar and sorbitol) was cut to a size measuring about 4 cm per side with a freezing band saw and stored at a temperature of from −10° C. to −8° C. The resultant was extruded into a minced state through use of a meat mincer (Meat grinder #42 GM-P4 manufactured by Nippon Career Industry, plate (plate diameter: 3.2 mm), one-stage mincing, clearance (gap) between a plate knife and a feed screw was adjusted to 0 mm). The temperature at a time of extrusion was from −3° C. to −2° C. The resultant was refrozen until the center temperature reached −18° C. or less in a freezer at −25° C. or less. The minced meat granules partially adhere to each other at a time of refreezing, and hence the refrozen minced fish meat was crushed into granules with a crusher ("Parapara-minchi-seizouki" a meat mincer manufactured by Iwata Food Co., Ltd.) to be packed into a bag.

The operation condition of a plate cutter and the feed screw of the meat mincer was changed to 121 rpm, 162 rpm, 203 rpm, and 243 rpm to produce frozen minced fish meat.

The results are shown in Table 1 and FIG. 2 to FIG. 5. As shown in Table 1, as the rotation speed was increased, the occurrence rate of meat granules each having an incomplete shape became higher. Photographs are illustrated in FIG. 2 to FIG. 5.

The general bacteria count of a raw material is 104 or less (2.3×103), and the bacteria count of the minced fish meat produced through the above-mentioned steps was also 104 or less (4.0×103).

When the minced fish meat was fried on a frying pan having oil spread thereon, the minced fish meat was heated into a granular shape as in the case of general minced livestock meat and was able to be used as a material for various dishes.

TABLE 1

| Rotation speed (rpm) | Rate (wt %) of complete shape (substantially columnar shape) |
|---|---|
| 121 | 96.9 |
| 162 | 92.4 |
| 203 | 81.4 |
| 243 | 78.3 |

Example 2

Frozen minced fish meat was produced through use of a fish block of Alaska Pollack and a fish block of salmon as materials. The same method as that of Example 1 was used. The temperature at a time of extrusion was maintained at −5° C. or less. The operation condition of a plate cutter and a feed screw of a meat mincer was set to 162 rpm (40 Hz).

The rate of a complete shape was counted in the same manner as in Example 1 to be 98.6% in the case of using the fish block of Alaska Pollack and 95.8% in the case of using the fish block of salmon. Thus, good results were obtained even when any of those raw materials was used.

Example 3

Results of component analysis of the frozen minced fish meat produced in Example 1 and Example 2 are shown in Table 2.

TABLE 2

| (/100 g) | Example 1 | Example 2 (Alaska Pollack) | Example 2 (Salmon) |
|---|---|---|---|
| Moisture | 73.9 g | 82.5 g | 76.5 g |
| Protein | 17.3 g | 15.9 g | 20.1 g |
| Fat | 0.4 g | 0.8 g | 2.2 g |
| Carbohydrate | 7.7 g | 0 g | 0 g |
| Ash | 0.7 g | 0.8 g | 1-2 g |
| Calorie | 104 kcal | 71 kcal | 100 kcal |
| Sodium | 142 mg | 95.8 mg | 137 mg |
| Salt equivalent | 0.4 g | 0.2 g | 0.3 g |

INDUSTRIAL APPLICABILITY

The frozen minced fish meat of the invention can be used easily in an appropriate amount as necessary as in the case of minced livestock meat. Therefore, the problem that it takes time and effort to cook fish meat is solved, and versatile easy-to-use fish meat foodstuff can be provided.

The invention claimed is:
1. A method of producing frozen minced fish meat granules, the method comprising:
   a) raising a temperature of fish meat which has been frozen at −20° C. or less to a temperature in a range of −10° C. to −5° C.;
   b) mincing the fish meat by rotating a plate knife of a meat mincer to form minced fish meat granules while maintaining the temperature of the fish meat in the range of −10° C. to −5° C., wherein the meat mincer has a feed screw, a plate, and the plate knife, and the plate knife rotates at a rotation speed that is equal to or less than 200 rpm to form the minced fish meat granules;

c) cooling the minced fish meat granules to a temperature that is equal to or less than −20° C., wherein the minced fish meat granules frozen at −20° C. or less partially adhere to each other; and d) separating the adhered minced fish meat granules into the frozen minced fish meat granules that have a substantially columnar shape.

2. The method according to claim 1, further comprising:

adjusting a distance between the plate knife and the feed screw of the meat mincer to 1 mm or less before the mincing of the fish meat.

3. The method according to claim 1, wherein a fish block, frozen ground fish meat, or frozen picked fish meat is used as a starting raw material of the fish meat.

4. The method according to claim 2, wherein a fish block, frozen ground fish meat, or frozen picked fish meat is used as a starting raw material of the fish meat.

5. The method according to claim 1, wherein, after the separation of the adhered minced fish meat granules, the frozen minced fish meat granules include:

90 wt % or more of the frozen minced fish meat granules each having a substantially columnar shape with a diameter of from 3 mm to 7 mm; and 10 wt % or less of the frozen minced fish meat granules each having an incomplete columnar shape with a short diameter of 2 mm or less.

6. The method according to claim 2, wherein, after the separation of the adhered minced fish meat granules, the frozen minced fish meat granules include:

90 wt % or more of the frozen minced fish meat granules each having a substantially columnar shape with a diameter of from 3 mm to 7 mm; and 10 wt % or less of the frozen minced fish meat granules each having an incomplete columnar shape with a short diameter of 2 mm or less.

7. The method according to claim 3, wherein, after the separation of the adhered minced fish meat granules, the frozen minced fish meat granules include:

90 wt % or more of the frozen minced fish meat granules each having a substantially columnar shape with a diameter of from 3 mm to 7 mm; and 10 wt % or less of the frozen minced fish meat granules each having an incomplete columnar shape with a short diameter of 2 mm or less.

8. The method according to claim 4, wherein, after the separation of the adhered minced fish meat granules, the frozen minced fish meat granules include:

90 wt % or more of the frozen minced fish meat granules each having a substantially columnar shape with a diameter of from 3 mm to 7 mm; and 10 wt % or less of the frozen minced fish meat granules each having an incomplete columnar shape with a short diameter of 2 mm or less.

* * * * *